Figure 1:
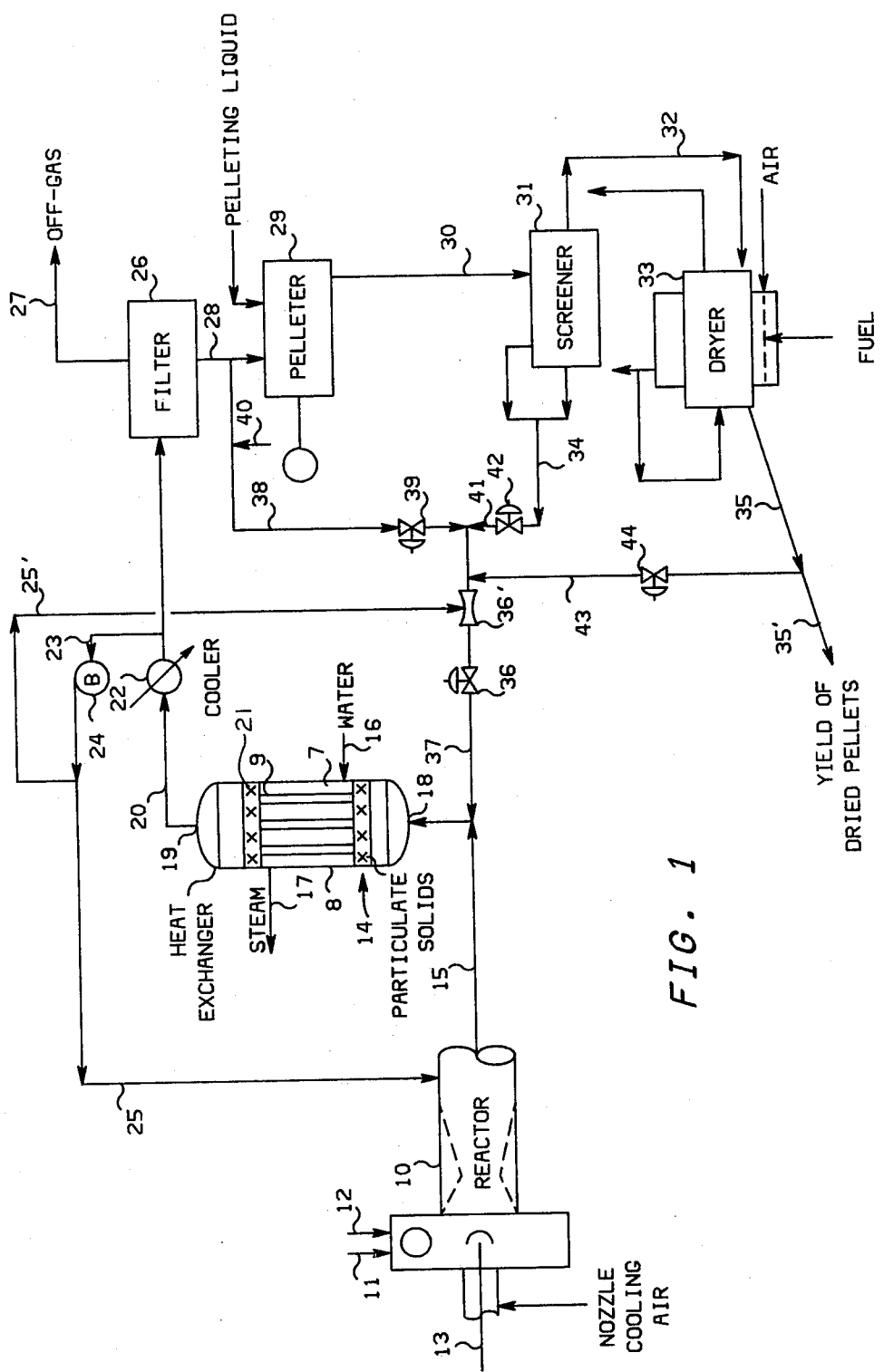

United States Patent [19]

Johnson

[11] 4,372,937
[45] Feb. 8, 1983

[54] WASTE HEAT RECOVERY
[75] Inventor: Paul H. Johnson, Bartlesville, Okla.
[73] Assignee: Phillips Petroleum Company, Bartlesville, Okla.
[21] Appl. No.: 292,103
[22] Filed: Aug. 11, 1981

Related U.S. Application Data

[62] Division of Ser. No. 141,502, Apr. 18, 1980, Pat. No. 4,296,800.

[51] Int. Cl.³ .......................... C01B 31/02; C09C 1/48
[52] U.S. Cl. .................................... 423/454; 423/450; 55/80; 55/98
[58] Field of Search .............. 423/449, 450, 454, 455, 423/456; 55/80, 98, 99; 165/95, 104.16

[56] References Cited

U.S. PATENT DOCUMENTS

| | | | |
|---|---|---|---|
| 2,492,948 | 1/1950 | Berger | 252/417 |
| 2,493,526 | 1/1950 | Campbell et al. | 252/417 |
| 2,550,722 | 5/1951 | Rollman | 165/104.16 |
| 2,571,380 | 10/1951 | Penick | 252/417 |
| 2,760,842 | 8/1956 | Ward | 23/1 |
| 2,762,752 | 9/1956 | Hemminger | 196/50 |
| 2,914,388 | 11/1959 | Kelley | 23/288 |
| 2,919,118 | 12/1959 | Hunter | 165/104.16 |
| 2,970,117 | 1/1961 | Harper | 252/417 |
| 4,220,193 | 9/1980 | Klaren | 165/104.16 |
| 4,220,193 | 9/1980 | Klaren | 165/104.16 |

FOREIGN PATENT DOCUMENTS

| | | |
|---|---|---|
| 695492 | 8/1953 | United Kingdom . |
| 868368 | 5/1961 | United Kingdom ........... 165/104.16 |

*Primary Examiner*—O. R. Vertiz
*Assistant Examiner*—Gregory A. Heller

[57] ABSTRACT

Combustion products containing particulate solids such as carbon black are quenched by indirect heat exchange and the build up of solids deposits on the heat exchange surfaces is minimized or deposits on the heat exchange surfaces are removed by providing a fixed bed of fluidizable particulate solids within the indirect heat exchanger and positioning a shell-tube heat exchanger within the bed of solids with the heat exchange fluid being in the shell side and with the gas stream containing entrained solids such as carbon black passing through the tubes which contain particulate solids. Fluidization of the particulate solids by the gas stream containing carbon black, for example, passing through the tubes cleans or keeps the inner peripheries of the tubes clean.

6 Claims, 2 Drawing Figures

WASTE HEAT RECOVERY

This is a divisional application of my copending application having Ser. No. 141,502, filed Apr. 18, 1980, now U.S. Pat. No. 4,296,800.

This invention relates to a method and apparatus for the transfer of heat from and to gases containing entrained solids. In accordance with another aspect, this invention relates to an improved apparatus comprising a waste heat recovery unit containing a fluidized fixed bed of particulate solids and a shell-tube heat exchange unit within the bed of particulate solids. In another aspect, this invention relates to a method for cleaning the inner peripheries of the tubes of an indirect heat exchange zone containing carbon deposits which indirect heat exchange zone is used to quench the effluent from a carbon black producing reaction zone or furnace.

In a typical furnace black process, a carbonaceous feed is introduced into a reactor and contacted with hot combustion gases which elevate the temperature of the feed to a temperature sufficiently high to decompose the feed to form combustion products containing particulate carbon black. Such combustion products are typically at a temperature in the range of about 2400° F. to about 2900° F. The combustion products are cooled, usually by introducing a quench fluid into the combustion products, to form an effluent (sometimes referred to as smoke) containing particulate carbon black. The effluent is subsequently separated into a gas phase and a particulate carbon black phase by separate means, such as a cyclone separator, bag filters, or the like. However, before the filtering or separation step, the effluent should be cooled to a temperature sufficiently low to prevent damage to the separation means. A plurality of cooling steps can be employed.

It is common practice to initially cool or quench the combustion products by injecting directly thereinto quench fluid at one or more points in a quench chamber portion of the reactor. Typical quench fluids include water, cooled effluent or smoke, and/or off-gas, the off-gas being a portion of the gas phase separated from the effluent. The first cooling step lowers the temperature of the combustion products to a temperature of about 2000° F. or less and preferably between about 1500° F. and 2000° F. The first cooling is done to lower the temperature of the combustion products to a temperature which can be safely accommodated in an indirect heat exchange means and to a temperature below which no further production of carbon black occurs.

A second step of cooling involves the use of a first indirect heat exchange means such as a shell-tube exchanger which further lowers the temperature of the effluent to a temperature of about 1200° F. or less and preferably between about 800° F. and about 1200° F. The thus cooled effluent can then be passed to one or more economizers, e.g., indirect heat exchangers which are operable for heating air and/or feed to be introduced into the reactor. It is also common practice in the art to finally cool the effluent by injecting a trim quench fluid into the effluent before separating effluent. One problem that has been encountered in the use of the shell-tube heat exchanger is that carbon black deposits tend to build up. Since carbon black is a good insulator, a thin layer of the carbon black will substantially lower the heat transfer rate in the indirect heat exchanger. It is, therefore, necessary to clean the indirect heat exchanger from time to time in order to maintain a high heat transfer rate and adequate operating efficiency. The present invention relates to a heat exchanger of the shell and tube type within a fixed bed of fluidizable particulate solids whereby the tendency of carbon black build up in the tubes is substantially minimized and/or deposits are removed by the fluidized solids.

Accordingly, an object of this invention is to provide an improved process for producing carbon black.

Another object of this invention is to provide an improved process for maintaininng heat exchange surfaces in a relatively clean condition for the quenching of carbon black smoke.

A further object of this invention is to provide a process for cleaning tubes of shell-tube heat exchangers or maintaining tubes substantially free of deposits without interrupting the operation to the extent that it is not necessary to shut down a carbon black producing process.

Another object of this invention is to provide an improved waste heat recovery apparatus.

A further object is to provide a method for carrying out heat exchange in a fluidized bed operation with gases containing suspended solids.

Other objects and aspects as well as the several advantages of the invention will be apparent to those skilled in the art upon reading the specification, the drawings, and the appended claims.

In accordance with the invention, a method is provided for producing carbon black which allows for preventing the build up of deposits and/or cleaning of deposits from an indirect heat exchanger without the aforementioned problems by providing a fixed fluidized bed of suitable particulate solids within the indirect heat exchanger and positioning a shell-tube heat exchanger within the bed of solids with the heat exchange fluid being on the shell side and with a gas stream containing entrained solids such as carbon black passing through the tubes which contain particulate solids.

In accordance with the instant indirect heat exchanger, heat is transferred from a gaseoous stream containing entrained solids to the fluidized solids and by way of the tubes of the heat exchanger to the shell fluid. In addition, the fluidized solids maintain the inner peripheries of the tubes substantially freed from deposits to allow efficient heat exchange.

Figure 2:
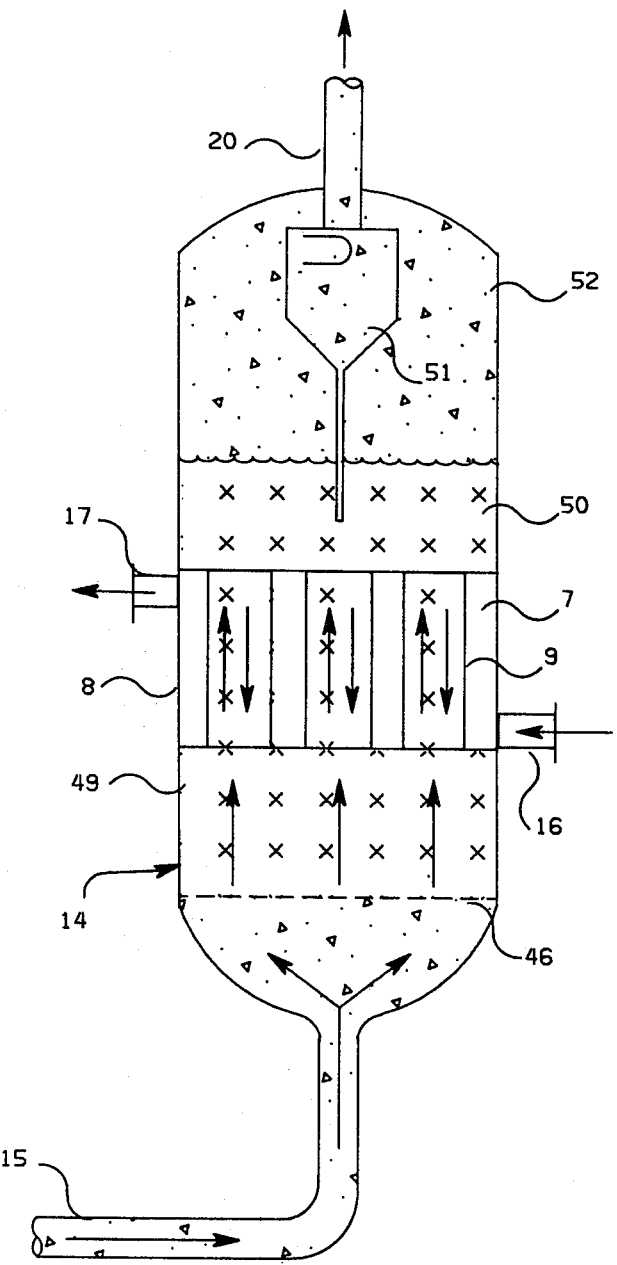

The advantages of the present invention will become apparent from the following detailed description taken in connection with the accompanying drawings which set forth by way of illustration and example certain embodiments of this invention wherein FIG. 1 is a schematic illustration of a carbon black producing process together with an indirect heat exchanger and recovery equipment and FIG. 2 is a detailed illustration of the indirect heat exchanger utilized to cool the carbon black effluent.

The reference numeral 10 designates generally a carbon black reactor of any suitable type. Air is introduced into the reactor 10 by way of conduit 11 and fuel is introduced into reactor 10 via an inlet 12. A carbonaceous feed is introduced into the reactor 10 by way of inlet 13. Air and fuel, introduced by way of inlets 11 and 12, respectively, can be combusted before introduction into the reactor or combusted within a combustion chamber of the reactor. The combustion gases contact the feed from the inlet 13 and pyrolize the feed to produce combustion products including particulate carbon black. Reactor 10 has the outlet thereof connected in flow communication with an indirect heat exchanger 14 by conduit means 15.

A heat exchange fluid, such as water, is introduced into the shell side 7 of a shell-tube heat exchange section 8 of the heat exchanger 14 by way of line 16 and, generally, discharges steam by way of outlet 17. Shell-tube heat exchange section 8 is provided with tubes 9 which are in open communication with inlet 18 and outlet 19 of heat exchanger 14. Tubes 9 are positioned within a fixed bed of fluidizable particulate solids 21. Reactor 10 effluent containing entrained carbon black in line 15 is introduced into heat exchanger 14 through inlet 18 and pass upwardly through the bed of particulate solids 21 and tubes 9 and exit through outlet 19 into line 20. The reactor effluent is passed through heat exchanger 14 under conditions which cause the bed of particulate solids to be fluidized and thus maintain the inner peripheries of tubes 9 substantially freed from carbon black deposits. In addition, the bed of particulate solids absorbs heat from the reactor effluent gases and transfers the heat to the heat exchange fluid in shell side 7. Heat exchange zone 14 is provided with a fixed fluidized bed of suitable particulate solids 21 extending from a lower portion of heat exchanger 14 below the inlet to tubes 9 to above the outlet of tubes 9 forming the tube and shell section 8 of the heat exchange unit 14.

The conduit means 20, includes a heat exchanger 22 for receiving effluent which can be used as the heat exchange medium for heating such fluids as air, carbonaceous feed, and/or water (for example, water charged at inlet 16) for use in the carbon black producing process as is known in the art. The effluent can be conducted from conduit means 20 via a conduit 23, pressured by a blower 24 which is connected in flow communication to conduit 23. The blower 24 is connected in flow communication to conduit means 25 which conducts the cooled effluent back to reactor 10 for use as a quench fluid as is known in the art.

Separating means 26, which can be a bag filter, is connected in flow communication with the conduit means 20 for receiving effluent therefrom. The separator means 26 is operable for separating the effluent into an off-gas phase portion for discharge via outlet 27 and a flocculent carbon black phase portion which is discharged via an outlet conduit means 28. The outlet conduit means 28 connects the separator means 26 in flow communication to a pelleter 29 as is known in the art. The pelleter 29 is operable for forming the flocculent carbon black into pellets. A discharge conduit means 30 connects the pelleter 29 in flow communication to a screener 31 which is operable for receiving the pellets from pelleter 29 and separating the pellets according to their size. Pellets of the desired size are discharged via discharge conduit means 32 to a dryer 33 for subsequent drying as is known in the art. Off-sized pellets are discharged from screener 31 via discharge conduit means 34. Dried pellets are discharged from the dryer 33 via a discharge conduit means 35, and yielded as product via conduit 35'.

In an alternative embodiment of the invention, carbon black recovered from the process can be used as the particulate solids for the fixed fluidized bed 49 and 50 in indirect heat exchanger 14 by recycling from filter 26, pelleter 29, screener 31 or dryer 33 through solids in such a manner that said bed of solids extends from below the inlet, through, and above the outlet of the tubes.

Conduit means 37 is connected in flow communication to inlet 18 of heat exchanger 14. This can be accomplished in any number of ways as, for example, by conduit means 37 opening into the conduit means 15 or the conduit means 37 can open into a portion of the reactor 10 (not shown) as, for example, into the throat of the venturi of the reactor 10. A combination of such connections can also be utilized. Control valve means 36 in conduit means 37 is operable for allowing sequential introduction of carbon black from a source of carbon black into heat exchanger 14. The carbon black introduced into heat exchanger 14 from conduit means 37 can be from any suitable source of carbon black either external of the apparatus or from the apparatus downstream of separating means 26.

In accordance with the alternative mode of operation, conduit means 37 is connected in flow communication to the carbon black outlet conduit means 28 for utilizing carbon black from the separator means 26 for introduction into heat exchanger 14. Heat exchanger 14 is "cleaned" by fluidized solids. In the illustrated structure, the flow of carbon black can be in one of several manners depending upon the type or types of carbon black desired to be introduced into heat exchanger 14. In the event it is desired to use partially agglomerated carbon black, conduit means 37 is connected in flow communication to the conduit means 28 via conduit means 38 which opens into conduit means 28. A control valve 39 is connected to conduit means 38 for selectively permitting flow of carbon black from conduit means 28 to the conduit means 37. Further, as an optional method of operation, water can be introduced into the carbon black in conduit means 38 as, for example, through an inlet conduit means 40 in a suitable mixer (not shown) in the event it is desired to use wet carbon black as a part of the particulate solids within heat exchanger 14.

Carbon black pellets can also be introduced into heat exchange 14 as part of the particulate solids. To accomplish this, a conduit means 41 connects conduit means 37 in flow communication to the discharge conduit means 34 and opens into the conduit means 34 for using off-sized specification carbon black pellets. Control valve 42 is connected in conduit means 41 for selectively permitting the use of off-specification carbon black pellets directly from the screener as particulate solids for heat exchanger 14.

Also, carbon black pellets from dryer 33 can be utilized as particulate solids in heat exchanger 14. To accomplish this, conduit means 43 connects conduit means 37 in flow communication to discharge conduit means 35. A control valve 44 is connected in conduit means 43 for selectively permitting the use of pellets from dryer 33 as part of the particulate solids in heat exchanger 14. Gas 25' from blower 24 can be used to actuate injector means 36' for conveying solids to conduit 18.

Referring now to FIG. 2, carbon black reactor smoke in conduit 15 having been quenched to about 2000° F. or less using water and/or recycle cooled smoke is quenched and charged to heat exchanger 14 containing a fluidizable bed of solids, such as sand, alumina, coke, carbon black pellets, and the like located above a distribution means or grid 46. A shell-tube type heat exchange section 8 having shell side 7 and tube means 9 is positioned within heat exchanger 14 above grid 46. Water enters the shell side at 16 and passes through shell side 7 surrounding tubes 9 and produced steam exits the shell at 17. The fluidized bed of solids (heat transfer material) extends from above grid 46 at 49 and through the tubes 9 and above the outlet ends of tubes 9 at 50.

Reactor smoke in conduit 15 passes upwardly through grid 46 and the fixed bed of particulate solids 49 and 50 at a rate sufficient to fluidize the bed of solids. The tubes 9 are so sized as to be of sufficient diameter to allow recirculation of the solids therethrough. The reactor smoke directly interchanges heat with the particulate solids which indirectly interchange heat with the water or other heat exchange fluid in shell 7 to produce steam. In addition, the above recirculation keeps the inner peripheries of the tubes substantially freed of carbon black deposits, affording high rate of heat exchange from the tube side (tubes 9) to the shell side (shell 7) of the shell-tube heat exchanger section 8.

A cyclone separator 51 is located in the dilute phase 52 above the fixed fluidized bed of solids to prevent the heat exchange solids from exiting via conduit 20 with the cooled reactor smoke, which exits at about 1200° F. and at this temperature can be used in conventional indirect heat exchange air preheaters, fuel preheaters, and feedstock preheaters of the carbon black operation. The finally cooled smoke is passed to conventional means (bag filter, cyclone, sand filters, etc.) as described in FIG. 1 to recover the carbon black product therefrom.

Although the invention has been illustrated above using a fixed fluidized bed of sand as the heat exchange solids, other solids such as alumina, silica-alumina, coke, or carbon black pellets, and the like, of course, can be used. Solids other than carbon black entrained in a gas can be heat exchanged with the fluidized solids. For example, various pigments entrained in gas can be used. Also, instead of water being in the shell side of the heat exchanger, Dowtherm or a hydrocarbon to be converted, for example, cracked thermally or preheated, can be used in the shell side of the heat exchanger.

Further, instead of cooling a material entrained in a gas, the system can be used to heat a material entrained in a gas with the heating fluid passing through the shell side located within the fluidized fixed bed of solids.

SPECIFIC EXAMPLE

The following calculated example sets forth conditions and particular dimensions for an apparatus such as set forth in the drawings.

| (a) Calculated Example | | |
|---|---|---|
| | Specific | Ranges |
| (15) Carbon Black Reactor Effluent: | | |
| SCF/hour, | 467,500 | — |
| Lbs CB/1000 SCF, | 6.47 | — |
| Temperature, °F. | 2,000 | 1800–2100 |
| Pressure, psig | 5 | 2–30 |
| (16) Water Feed: | | |
| Lbs/hour, | 12,700 | — |
| Temperature, °F., | 480 | 300–500 |
| Pressure, psig | 600 | 50–650 |
| (17) Steam Yield: | | |
| Lbs/hour, | 12,700 | — |
| Temperature, °F., | 488 | 300–500 |
| Pressure, psig, | 600 | 50–650 |
| (20) Cooled Reactor Effluent: | | |
| SCF/hour, | 467,500 | — |
| Lbs/CB/1000 SCF, | 6.47 | 3 to 10 |
| Temperature, °F., | 1,200 | 1000–1600 |
| Pressure, psig, | 3 | 2–30 |

| (b) Apparatus Dimensions | | |
|---|---|---|
| | Specific | Ranges |
| Conduit (15): | | |
| Diameter, inches, | 18 | 10–30 |
| Boiler Unit (14): | | |
| Diameter, feet, | 8 | 5–15 |
| Height, feet, | 15 | 5–30 |
| Bed (49): | | |
| Height, feet, | 1(a) | 0.5–3 |
| (a) above grid (46), below tubes (9) | | |
| Tubes (9): | | |
| Number used, | 10 | 3–25 |
| Diameter, feet, | 2 | 1 to 3 |
| Height, feet, | 5 | 3 to 20 |
| Height to Diameter Range, | 2.5:1 | 2:1 to 7:1 |
| Grid (46): | | |
| Aperture Size, each, inches, | 1 | 0.5–3 |
| Total aperture area, square inches, | 174 | — |
| Bed (50): | | |
| Height, feet, | 1(c) | 0.5–3 |
| (c) above tubes (9) | | |

Shell-tube exchanger is of carbon steel.

Solids used can include sand, $Al_2O_3$, coke, carbon black pellets, and the like.

SPECIFIC ON $Al_2O_3$

| Specific on $Al_2O_3$ | | |
|---|---|---|
| Particle size range, U.S. Standard mesh, | 16 to 45 | 10–60 |
| Composition: | wt. % | |
| $SiO_2$ | 2 | |
| $Al_2O_3$ | 95.5 | |
| $TiO_2$ | 2.5 | |

I claim:

1. A process for producing carbon black by pyrolysis of a feed hydrocarbon wherein a gas stream containing carbon black is passed through a means defining a flow path of an indirect heat exchanger, said process comprising preventing the substantial build up of carbon black deposits or cleaning carbon black deposits or both from said means defining a flow path by
   (a) providing a fixed bed of fluidizable particulate solids within said indirect heat exchanger,
   (b) positioning a shell-tube heat exchange section having a plurality of tubes within said bed of solids in such a manner that said bed of solids extends from below the inlet, through, and above the outlet of the tubes with the heat exchange fluid passing through the shell side and with said gas stream containing carbon black passing through the tubes which contain said particulate solids whereby heat is transferred from the gas stream containing the carbon black to the fluidized particulate solids and by way of the tubes to the shell fluid, said tubes being so sized as to have a length to diameter ratio sufficient to allow both upwardly and downwardly movement of said particulate solids within said tubes,
   (c) passing said gas containing carbon black through said bed of solids under conditions which cool said gas and fluidize said bed to maintain the inner peripheries of the tubes substantially freed from carbon black deposits to allow efficient heat exchange, and (d) withdrawing said cooled gas through a gas-solids separator positioned above said bed of solids within the cooling zone to prevent particulate solids from escaping with the cooled gas by recovering same and returning recovered entrained particulate solids to said fixed bed.

2. A process according to claim 1 wherein said bed is sand.

3. A process according to claim 1 wherein at least a portion of the bed of particulate solids is partially agglomerated carbon black or carbon black pellets produced in the process and recycled to said heat exchanger.

4. A process according to claim 1 wherein said tubes in said shell-tube heat exchange section are so sized as to be of a diameter of at least one foot and a height to diameter ratio range of 2:1 to 7:1 to allow recirculation of the particulate solids within each tube to maintain the inner peripheries of the tubes substantially freed from deposits to permit efficient heat exchange.

5. A process according to claim 1 wherein said gas in (c) is passed upwardly through said tubes containing particulate solids which are maintained as a fixed fluidized bed of solids within each of said tubes by the upward flow through said tubes of said gas containing suspended carbon black.

6. A process according to claim 1 wherein the inlet of said tubes is at least about one foot above the bottom of said bed of solids and the outlet of said tubes is at least one foot below the top of said bed of solids.

* * * * *